US012345844B2

(12) United States Patent
Liu (10) Patent No.: US 12,345,844 B2
(45) Date of Patent: Jul. 1, 2025

(54) MANUAL ACOUSTIC AXIS ALIGNING METHOD FOR ULTRASONIC SOUND FIELD MEASURING SYSTEM

(71) Applicant: XI'AN UNIVERSITY OF POSTS & TELECOMMUNICATIONS, Shaanxi (CN)

(72) Inventor: Rui Liu, Shaanxi (CN)

(73) Assignee: XI'AN UNIVERSITY OF POSTS & TELECOMMUNICATIONS, Shaanxi (CN)

( * ) Notice: Subject to any disclaimer, the term of this patent is extended or adjusted under 35 U.S.C. 154(b) by 436 days.

(21) Appl. No.: 17/797,711

(22) PCT Filed: Jan. 10, 2022

(86) PCT No.: PCT/CN2022/071128
§ 371 (c)(1),
(2) Date: Aug. 4, 2022

(87) PCT Pub. No.: WO2022/179325
PCT Pub. Date: Sep. 1, 2022

(65) Prior Publication Data
US 2023/0168401 A1 Jun. 1, 2023

(30) Foreign Application Priority Data
Feb. 25, 2021 (CN) .......................... 202110214437.5

(51) Int. Cl.
*G01H 3/00* (2006.01)
*G01V 1/18* (2006.01)
(Continued)

(52) U.S. Cl.
CPC ............ *G01V 1/186* (2013.01); *G01V 1/3808* (2013.01); *G01V 13/00* (2013.01)

(58) Field of Classification Search
CPC ............ G01H 3/00; G01H 3/14; G01V 13/00; G01V 1/186; G01V 1/3808
See application file for complete search history.

(56) References Cited

U.S. PATENT DOCUMENTS 5,844,140 A 12/1998 Seale
2013/0144171 A1 6/2013 Watson

FOREIGN PATENT DOCUMENTS

CN 2000287300 A 10/2000
CN 102279044 A 12/2011
(Continued)

OTHER PUBLICATIONS

CN-110559013-A (Machine Translation) (Year: 2019).*
(Continued)

*Primary Examiner* — Yuqing Xiao
*Assistant Examiner* — Christopher Richard Walker (57) ABSTRACT

The present disclosure belongs to the technical field of an ultrasonic sound field measuring system, and relates to a manual acoustic axis aligning method for an ultrasonic sound field measuring system. The method comprises: obtaining an intersection between a current acoustic axis and a plane by scanning two detection planes, and calculating an inclination angle of the current acoustic axis; judging whether the inclination angle is less than an adjustment threshold. The method does not depend on the specific mechanical implementation of adjusting an acoustic axis angle. The iterative algorithm combined with geometric information can converge quickly. The criterion of intersection between the acoustic axis and the plane used is not limited to the amplitude criterion, and other criteria can be introduced by increasing the distance between two planes to increase the robustness of measuring the acoustic axis angle.

10 Claims, 10 Drawing Sheets (51) Int. Cl.
     *G01V 1/38*        (2006.01)
     *G01V 13/00*     (2006.01)

(56)           References Cited

FOREIGN PATENT DOCUMENTS

| | | | |
|---|---|---|---|
| CN | 105251140 | A | 1/2016 |
| CN | 107514966 | A | 12/2017 |
| CN | 110559013 | A * | 12/2019 |
| CN | 110726470 | A | 1/2020 |
| CN | 113008354 | A | 6/2021 |
| JP | 2000287300 | A | 10/2000 |
| JP | 2002096716 | A | 4/2002 |
| WO | 2020174214 | A1 | 9/2020 |

OTHER PUBLICATIONS International research report of PCT/CN2022/071128.
John Civale, Ian Rivens and Gail ter Haar Measurement of Angle of Ultrasound Propagation from Phase Journal of Physics: Conference Series vol. 279, May 14, 2010 (May 14, 2010) doi:10.1088/1742-6596/279/1/012016.

* cited by examiner

MANUAL ACOUSTIC AXIS ALIGNING METHOD FOR ULTRASONIC SOUND FIELD MEASURING SYSTEM

TECHNICAL FIELD

The present disclosure belongs to the technical field of an ultrasonic sound field measuring system, and relates to a manual acoustic axis aligning method, in particular to a manual acoustic axis aligning method for an ultrasonic sound field measuring system.

BACKGROUND

Figure 1:
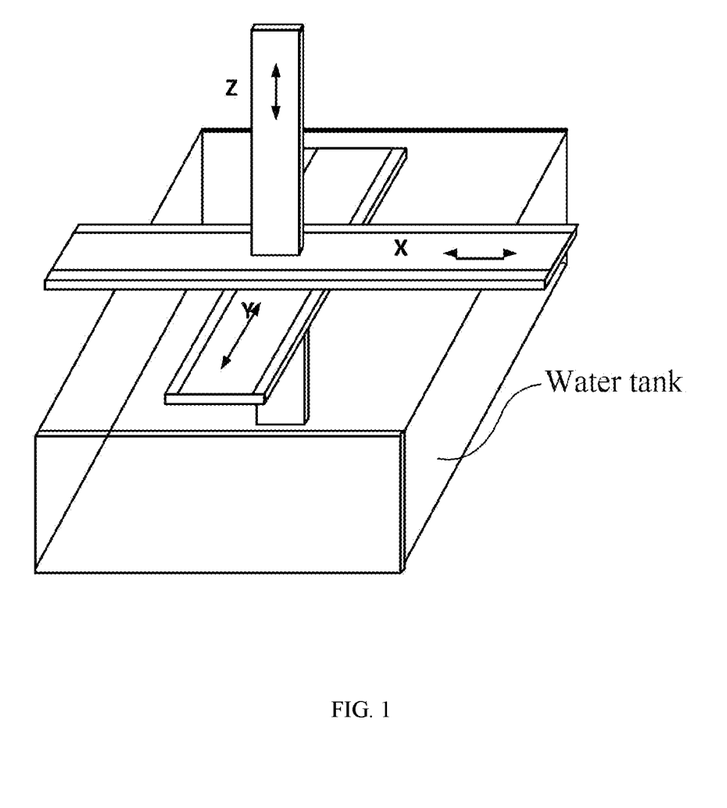
FIG. 1 is a schematic structural diagram of a multi-axis water tank system.

A hydrophone method, is one of the standard methods of measuring sound fields. The method uses a hydrophone to perform three-dimensional scanning on a target sound field in a multi-axis water tank system to obtain the sound field distribution, and then calculates a plurality of acoustic parameters based thereon. The method can measure many parameters and is most widely used. In order to scan the three-dimensional sound, field, the multi-axis water tank system comprises at least three moving axes perpendicular to each other, as shown in FIG. 1. During the measurement, when being driven by a mechanical axis, a hydrophone and a probe move relatively along three axes (X, Y, Z). In order to ensure the effectiveness of measurement, according to the method published in NEMA LTD 2 standard, the acoustic axis must be aligned prior to measurement that is, the transducer orientation should be adjusted, so that the axis of the transmitting sound field is changed to be parallel to the Z axis, that is, the acoustic axis should be aligned. After the acoustic axis is aligned, by adjusting the positions of X and Y, the Z-direction scanning can be carried out along the acoustic axis, so that the correctness of the subsequent parameters such as sound field distribution, MI and $I_{SPTA}$ can be guaranteed.

In order to realize the alignment of acoustic axes, the multi-axis water tank system adds two angle adjustment axes perpendicular to each other on the basis of three linear motion axes to adjust the angle of acoustic axes in space. At present, there are two categories of multi-axis water tank systems: a fully automatic five-axis system and a hybrid five-axis (automatic three-axis and manual two-axis) (angle adjustment) system. The fully automatic five-axis water tank system, such as AIMS system of ONDA, uses an angle adjusting shaft driven by a stepping motor via a belt to align the acoustic axis. The whole system operates under the control of a computer. The computer controls the rotation angle of each rotating shaft. After each adjustment, the acoustic axis angle is measured, and the automatic alignment of the acoustic axis is completed by a feedback iterative algorithm. It is convenient to use AIMS, but its application is limited because of its high price. The hybrid five-axis system uses two manual axes to adjust the acoustic axis angle and realize the alignment of the acoustic axis, and is high in cost performance, which is widely used in the field of sound field measurement. Such system needs to adjust the angle manually in the process of acoustic axis alignment. Compared with automatic adjustment, the biggest problem is that the angle of each adjustment cannot be accurately obtained, so that a manual adjusting method must be used to gradually align the acoustic axis.

Figure 2:
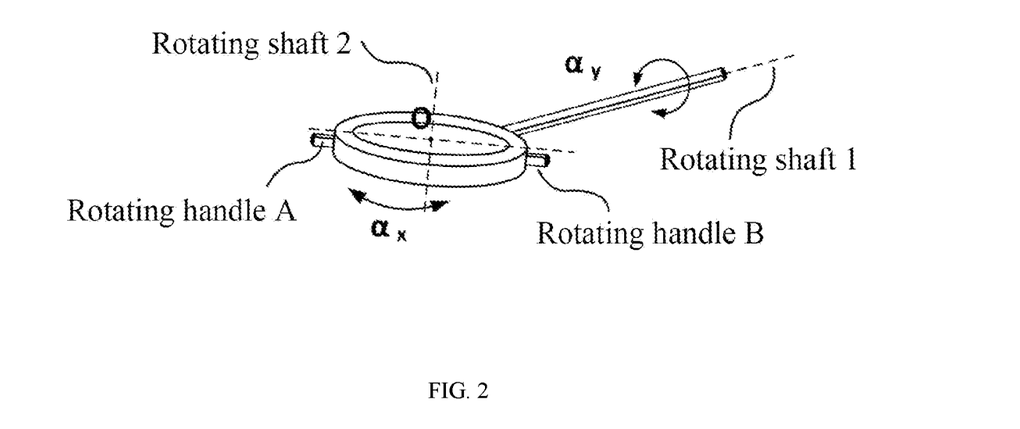
FIG. 2 is a schematic structural diagram of a device of adjusting an acoustic axis angle using two manual axes.

As shown in FIG. 2, a mechanical implementation of adjusting the acoustic axis angle using two manual axes is given. The two-axis manual adjusting device is fixed at the lower part of a Z-axis movement mechanism. The probe is fixed on the disk, so as to rotate around the first rotation axis by adjusting the plane of the disk and rotate around the vertical line (second rotation axis) of the center of the disk by rotating handles A and B. If the current acoustic axis is not parallel to the Z axis, and there is an included angle between the current acoustic axis and the Z axis, the acoustic axis can be adjusted to be parallel to the Z axis by these two rotation methods. The performance of the acoustic axis aligning method is the main restriction factor that limits the application of the hybrid five-axis system. Poor alignment reliability and too many iterative adjustments will result in long measurement time, large measurement error and poor measurement repeatability. In particular, for some scenes, many adjustments cannot achieve satisfactory acoustic axis alignment results, resulting in measurement failure. So far, there is no efficient and reliable aligning method available. The existing patent application number CN201110112244.5 discloses an automatic collimation method of a hydrophone in ultrasonic sound field measurement, and puts forward the method of edge amplitude for acoustic axis alignment, but does not involve the specific adjustment method of manual acoustic axis alignment.

SUMMARY

The purpose of the present disclosure is to overcome the shortcomings of the prior art and provide a manual acoustic axis aligning method for an ultrasonic sound field measuring system, so as to improve the reliability of the acoustic axis alignment and reduce the number of iterative adjustments, and avoid the problems of long measurement time, large measurement error and poor measurement repeatability.

To achieve the above purpose, the present disclosure provides the following technical scheme.

A manual acoustic axis aligning method for an ultrasonic sound field measuring system is provided, specifically comprising the following cycles:

1) determining three planes according to the focus position, wherein the three planes are a focusing plane $Z_{focus}$, an acoustic axis angle detection plane $Z_1$ and an acoustic axis angle detection plane $Z_2$; defining the distances from the probe surface to the focusing plane $Z_{focus}$, the acoustic axis angle detection plane $Z_1$ and the acoustic, axis angle detection plane $Z_2$ as $D_{focus}$, a and b, respectively;

2) determining a peak point of an underwater acoustic signal of the focusing plane $Z_{focus}$ and taking the peak point as an initial center point $PC_1$, and denoting the coordinate of the initial center point $PC_1$ as $[PC\_X_1, PC\_Y_1]$;

3) in the acoustic axis angle detection plane $Z_1$, scanning with $PC_i$ as the center, changing the coordinates of X and Y, and, acquiring sound field signals to obtain the intersection $C1=[C1_X, C1_Y]$ between the acoustic axis and the acoustic axis angle detection plane $Z_1$, where i is a positive integer;

4) in the acoustic axis angle detection plane $Z_2$, scanning with $PC_i$ as the center, changing the coordinates of X and Y, and acquiring sound field signals to obtain the intersection $C2=[C2_X, C2_Y]$ between the acoustic axis and the acoustic axis angle detection plane $Z_2$, where i is a positive integer;

5) calculating the inclination angle $\theta_i=[\theta x_i, \theta y_i]$ of the current acoustic axis according to the intersection points C1 and C2; $\theta x_i$ is the included angle between the acoustic axis and Z axis after the acoustic axis is projected on XOZ, plane, and $\theta y_i$ is the included angle between the acoustic axis and Z axis after the acoustic axis is projected on YOZ plane;

6) judging whether the inclination angle $\theta_i$ is less than the adjustment threshold, if so, aligning the acoustic axis, ending the adjustment, otherwise, proceeding to step 7);

7) according to the inclination angle $\theta_i$, calculating the next coordinate $PC_i=[PC\_X_i, PC\_Y_i]$ by using an iterative algorithm, where i is an integer not less than 2;

8) keeping $PC_i$ of the X axis and Y axis unchanged, moving the Z axis to the focusing plane $Z_{focus}$, manually adjusting two corner adjustment knobs of a probe clamping device until the amplitude of a hydrophone measurement signal at the current coordinate point is the maximum, and then proceeding to step 3).

Further, in step 1), the acoustic axis angle detection plane $Z_1$ and the acoustic axis angle detection plane $Z_2$ are located on the same side or different sides of the focusing plane $Z_{focus}$.

Further, in step 2), the peak point is the maximum point of the underwater acoustic signal of the focusing plane.

Further, in step 3) and step 4), according to the acquired sound field signals, the intersection $C1=[C1_X, C1_Y]$ between the acoustic axis and the acoustic axis angle detection plane $Z_1$, and the intersection $C2=[C2_X, C1_Y]$ between the acoustic axis and the acoustic axis angle detection plane $Z_2$ are obtained by a simple amplitude criterion or the criterion for calculating the symmetry center based on symmetry, respectively.

Further, the simple amplitude criterion is the amplitude maximum criterion, and the criterion for calculating the symmetry center based on symmetry is the centroid criterion.

Further, in step 5), the specific calculation formula of the coordinate value of the inclination angle $\theta_i$ is as follows:

$$\theta x_i = \arctan((C2_X - C1_X)/(b-a)) \quad (1)$$

$$\theta y_i = \arctan((C2_Y - C1_Y)/(b-a)) \quad (2)$$

Further, in step 7), calculating the next coordinate $PC_i = [PC\_X_i, PC\_Y_i]$ by using an iterative algorithm has the specific calculation process as follows:

if the inclination angle of the current acoustic axis is obtained after the first adjustment, calculating the adjustment amount according to the triangular relationship, the coordinate $PC_2=[PC\_X_2, PC\_Y_2]$ of a new center point is calculated according to the depth $D_{focus}$ of the focusing plane $Z_{focus}$ with the following formula:

$$PC\_X_2 = PC\_X_1 + \tan(\theta x_1) \times (D_{focus} - a) \quad (3)$$

$$PC\_Y_2 = PC\_Y_1 + \tan(\theta y_1) \times (D_{focus} - a) \quad (4)$$

in the above formulas (3) and (4), the inclination angle $\theta_1=[\theta x_1, \theta y_1]$ of the current acoustic axis is obtained after the first adjustment;

otherwise, the calculation formula of the coordinate $PC_{i+1}=[PC\_X_{i+1}, PC\_Y_{i+1}]$ of the new center point is as follows:

$$PC\_X_{i+1} = (PC\_X_i - PC\_X_{i-1})/(\theta x_i - \theta x_{i-1}) \times \theta x_i \quad (5)$$

$$PC\_Y_{i+1} = (PC\_Y_i - PC\_Y_{i-1})/(\theta y_i - \theta y_{i-1}) \times \theta y_i \quad (6)$$

in the above formulas (5) and (6), i is an integer not less than 2, the inclination angle of the current acoustic axis is $\theta_i=[\theta x_i, \theta y_i]$, and the inclination angle before the inclination angle of the current acoustic axis is adjusted is $\theta_{i-1}=[\theta x_{i-1}, \theta y_{i-1}]$.

Further, the order of step 3) and the order of step 4) are interchangeable.

Further, in step 3) and step 4), a computer controls a water tank system to automatically scan the acoustic axis angle detection plane $Z_1$ or the acoustic axis angle detection plane $Z_2$.

Further, the larger the interval between the acoustic axis angle detection plane $Z_1$ and the acoustic axis angle detection plane $Z_2$, the higher the alignment accuracy.

Compared with the prior art, the technical scheme according to the present disclosure has the following beneficial effects: first, the depths of the acoustic axis angle detection plane $Z_1$ and the acoustic axis angle detection plane $Z_2$ are randomly chosen, which can be both in front of the focusing plane, on both sides of the focusing plane or both behind the focusing plane. Moreover, the choice of the acoustic axis angle detection plane $Z_1$ and the acoustic axis angle detection plane $Z_2$ does not affect the convergence and the convergence speed of the acoustic axis aligning method, which can be applied to various applications. Then, the angle of the acoustic axis is calculated by the intersection between the acoustic axis and two XOY planes with different depths. On these two planes, the computer controls the water tank system to automatically scan while acquiring the data of the sound field, and then the intersection position of the acoustic axis is judged and calculated according to the data of the sound field. Finally, the iterative algorithm combined with geometric information can converge quickly, and the performance of the aligning method does not depend on the specific mechanical implementation of adjusting an acoustic axis angle.

In addition, the criterion of intersection between the acoustic, axis and the plane can be a simple amplitude criterion or other criteria for calculating the symmetry center based on symmetry. Considering that the criterion based on amplitude (maximum amplitude) can only be used around the focusing plane, the criterion is invalid when being far away from the focusing plane (the signal amplitude on the acoustic axis is no longer the maximum value of the XOY plane). The criterion of intersection between the acoustic axis and the plane used in the present disclosure is not limited to the amplitude criterion, and other criteria can be introduced by increasing the distance between two planes to increase the robustness of measuring the acoustic axis angle.

DETAILED DESCRIPTION OF THE EMBODIMENTS

The present disclosure will be further described in detail with reference to the drawings hereinafter.

Figure 3A:
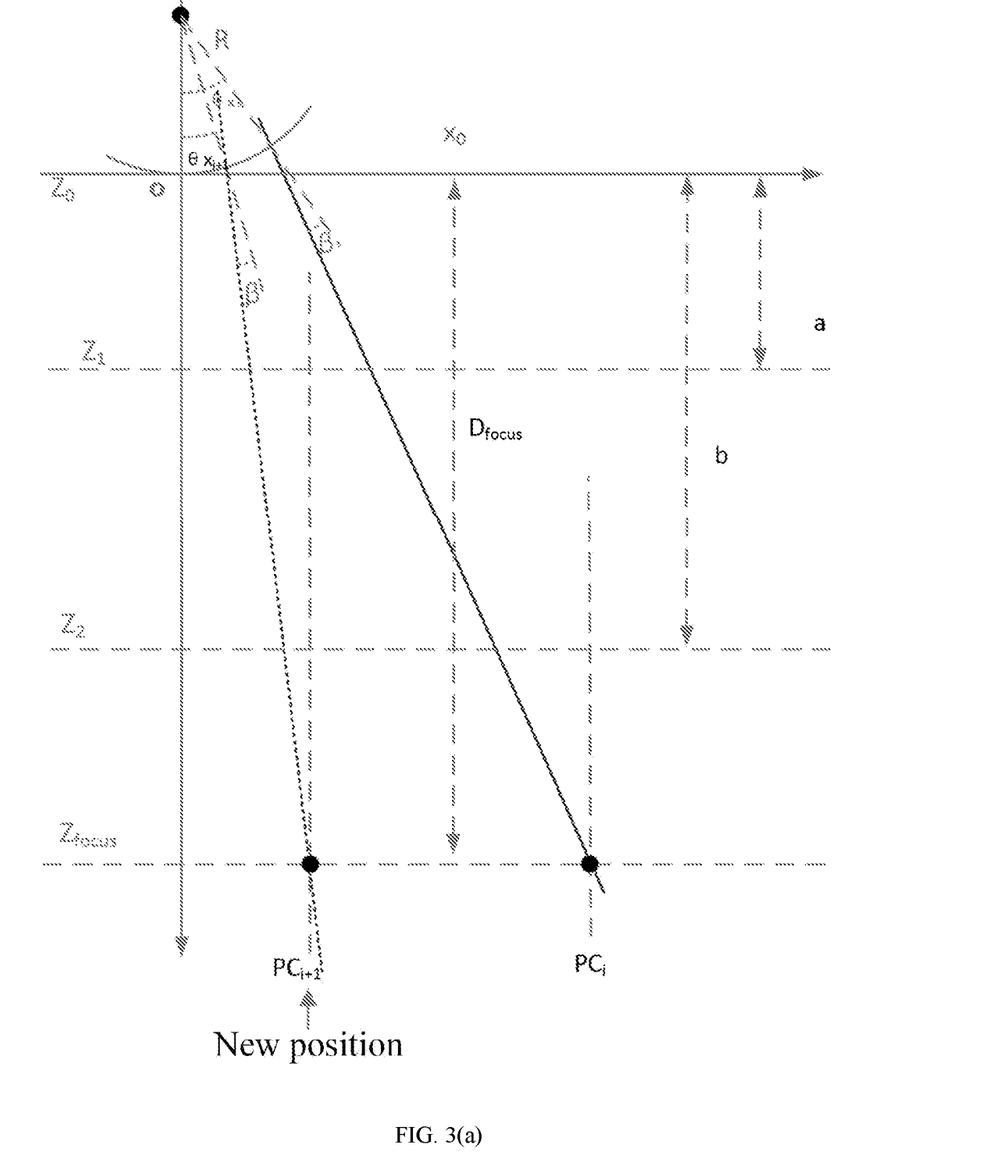
FIG. 3(a) is a schematic diagram of acoustic axis angle detection planes $Z_1$ and $Z_2$ located at the upper side of a focusing plane $Z_{focus}$ according to the present disclosure.
Figure 3B:
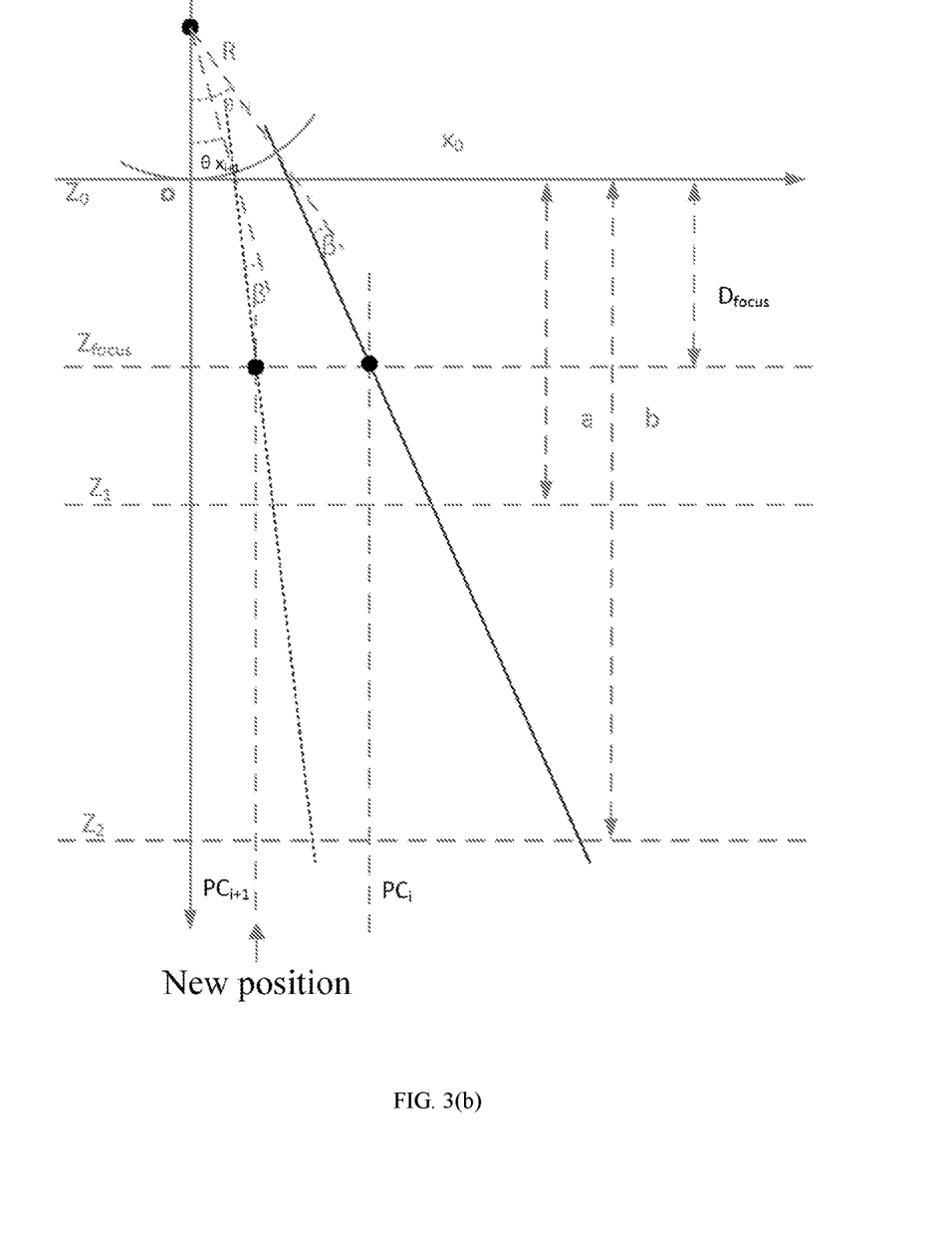
FIG. 3(b) is a schematic diagram of acoustic axis angle detection planes $Z_1$ and $Z_2$ located at the lower side of a focusing plane $Z_{focus}$ according to the present disclosure.
Figure 3C:
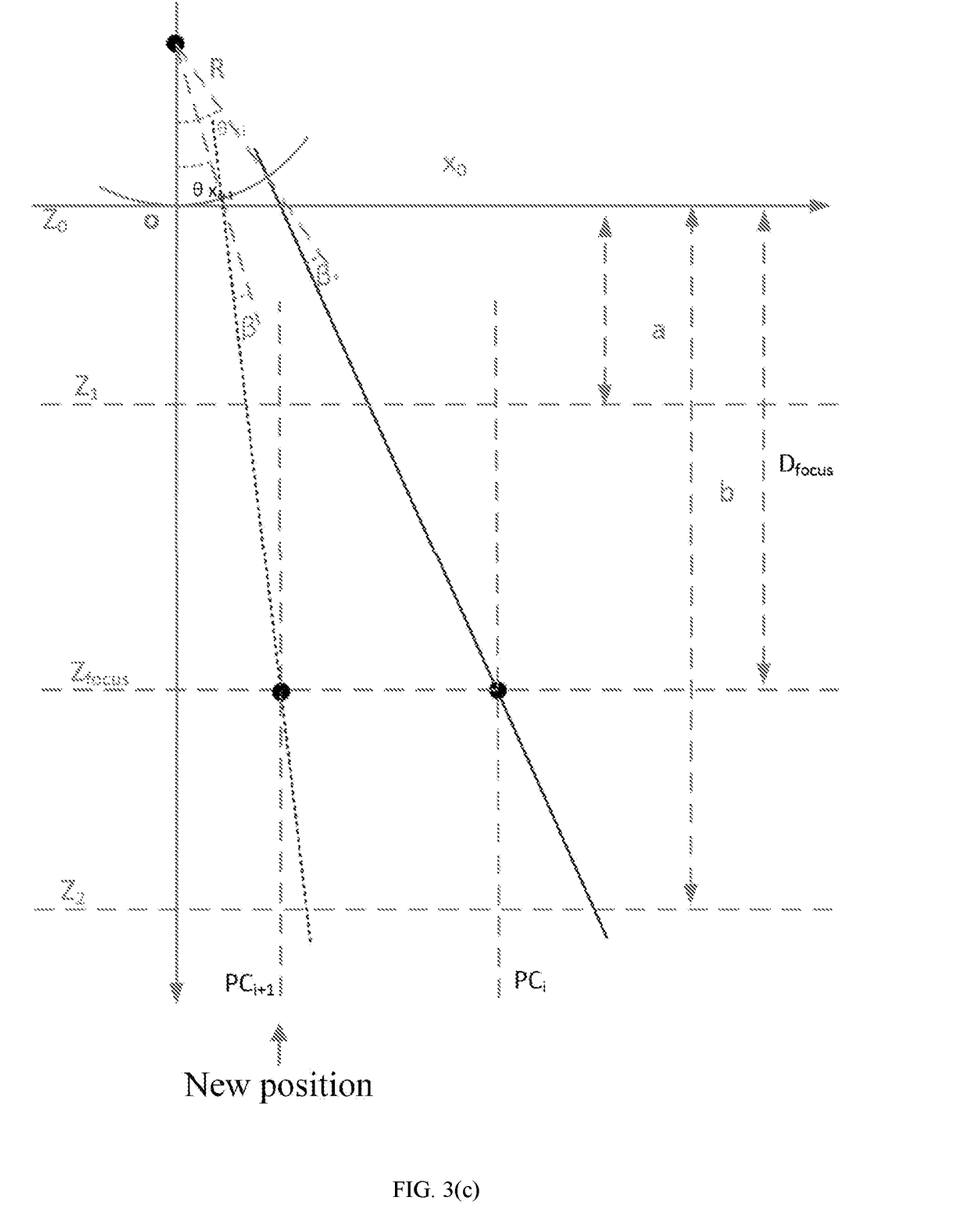
FIG. 3(c) is a schematic diagram of acoustic axis angle detection planes $Z_1$ and $Z_2$ located at both sides of a focusing plane $Z_{focus}$ according to the present disclosure.
Figure 8:
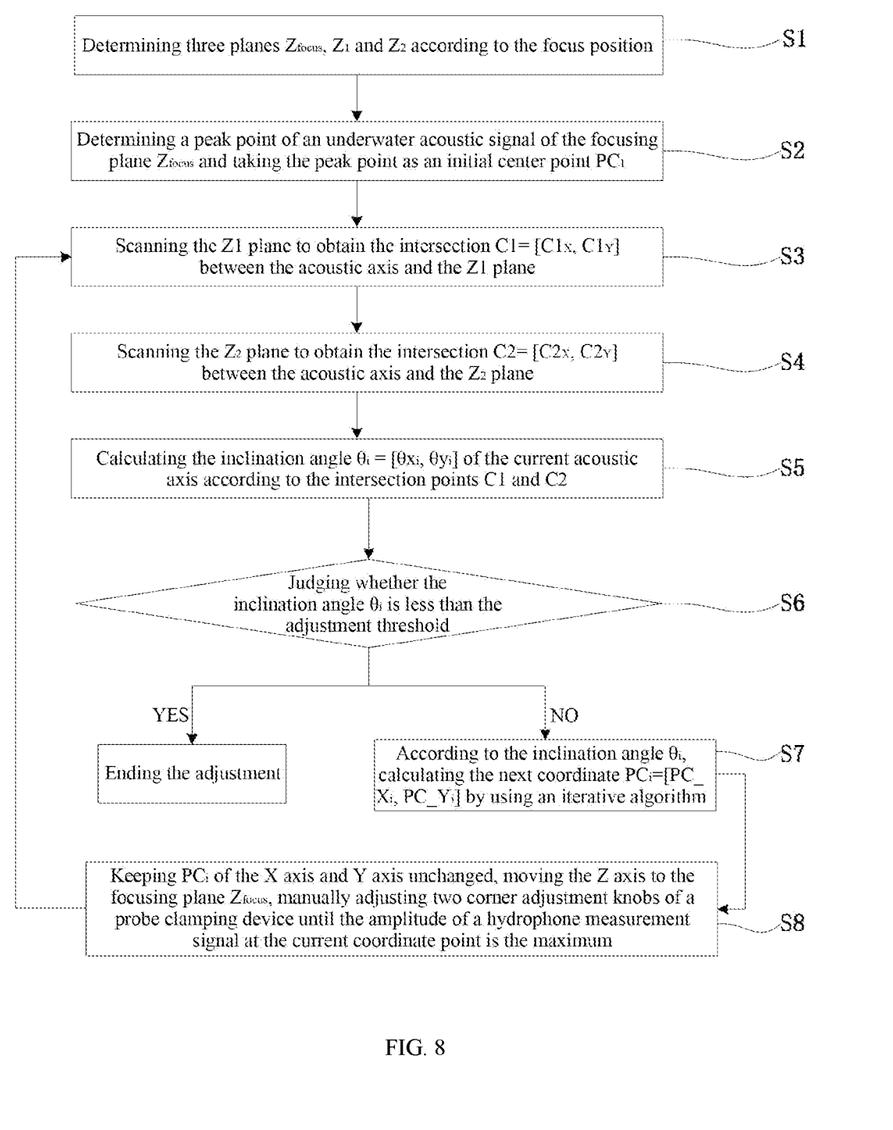
FIG. 8 is a flowchart of a manual acoustic axis aligning method according to the present disclosure.

As shown in FIG. 8, the present disclosure provides a manual acoustic axis aligning method for an ultrasonic sound field measuring system, specifically comprising the following cycles:

S1, determining three planes according to the focus position, wherein the three planes are a focusing plane $Z_{focus}$, an acoustic axis angle detection plane $Z_1$ and an acoustic axis angle detection plane $Z_2$; defining the distances from the probe surface to the focusing plane $Z_{focus}$, the acoustic axis angle detection plane $Z_1$ and the acoustic axis angle detection plane $Z_2$ as $D_{focus}$, a and b, respectively; for convenience of description, FIGS. 3(a), (b) and (c) show the acoustic axis angle detection planes $Z_1$ and $Z_2$, the focusing plane $Z_{focus}$ and the projection of the acoustic axis on XOZ plane, with similar results in YOZ plane: $D_{focus}$ is the focal depth of the probe, which is determined by the probe parameters; the acoustic angle detection planes $Z_1$, $Z_2$ can be located at the upper side of the focusing plane $Z_{focus}$ (i.e. in front of the focusing plane), as shown in FIG. 3 (a); or located at the lower side of the focusing plane $Z_{focus}$ (i.e. behind the focusing plane), as shown in FIG. 3 (b); or at both sides of the focusing plane $Z_{focus}$, as shown in FIG. 3 (c); the larger the interval between the acoustic angle detection planes $Z_1$ and $Z_2$, the more accurate the angle measurement and the higher the alignment accuracy;

S2, determining a peak point of an underwater acoustic signal of the focusing plane $Z_{focus}$, and taking the peak point as an initial center point $PC_1$, and denoting the coordinate of the initial center point $PC_1$ as $[PC\_X_1, PC\_Y_1]$; wherein the peak point is the maximum point, of the underwater acoustic signal of the focusing plane;

S3, scanning the $Z_1$ plane: in the $Z_1$ plane, scanning with $PC_i$ as the center, changing the coordinates of X and Y, and acquiring sound field signals to obtain the intersection $C1=[C1_X, C1_Y]$ between the acoustic axis and the $Z_1$ plane through the criteria, such as centroid or maximum value;

S4, scanning the $Z_2$ plane: in the $Z_2$ plane, scanning with $PC_i$ as the center, changing the coordinates of X and Y, and acquiring sound field signals to obtain the intersection $C2=[C2_X, C1_Y]$ between the acoustic axis and the $Z_2$ plane through the criteria such as centroid or maximum value;

S5, calculating the inclination angle $\theta_i=[\theta x_i, \theta y_i]$ of the current acoustic axis according to the intersection points C1 and C2; wherein $\theta x_i$ is the included angle between the acoustic axis and Z axis after the acoustic axis is projected on XOZ plane, and $\theta y_i$ is the included angle between the acoustic axis and Z axis after the acoustic axis is projected on YOZ plane;

$$\theta x_i = \arctan((C2_X - C1_X)/(b-a)) \quad (1)$$

$$\theta y_i = \arctan((C2_Y - C1_Y)/(b-a)) \quad (2)$$

S6, determining an adjustment threshold according to the alignment accuracy requirement of sound field measurement, and judging whether the current inclination angle $\theta_i$ is smaller than the adjustment threshold; if so, aligning the acoustic axis, ending the adjustment, otherwise, proceeding to step S7;

S7, according to the inclination angle $\theta_i$, calculating the next coordinate $PC_i=[PC\_X_i, PC\_Y_i]$ by using an iterative algorithm, and the specific calculation process is as follows:

setting the inclination angle $\theta_i=[\theta x_i, \theta y_i]$ of the current acoustic axis, and the result after iteration is as follows:

if the inclination angle of the current acoustic axis is obtained after the first adjustment, calculating the adjustment amount according to the triangular relationship, the coordinate $PC_2=[PC\_X_2, PC\_Y_2]$ of a new center point is calculated according to the depth. $D_{focus}$ of the focusing plane $Z_{focus}$ with the following formula:

$$PC\_X_2 = PC\_X_1 + \tan(\theta x_1) \times (D_{focus} - a) \quad (3)$$

$$PC\_Y_2 = PC\_Y_1 + \tan(\theta y_1) \times (D_{focus} - a) \quad (4)$$

if the inclination angle of the current acoustic axis is not obtained after the first adjustment, the calculation formula of the coordinate $PC_2=[PC\_X_2, PC\_Y_2]$ of the new center point is as follows:

$$PC\_X_{i+1} = (PC\_X_i - PC\_X_{i-1})/(\theta x_i - \theta x_{i-1}) \times \theta x_i \quad (5)$$

$$PC\_Y_{i+1} = (PC\_Y_i - PC\_Y_{i-1})/(\theta y_i - \theta y_{i-1}) \times \theta y_i \quad (6)$$

in the above formulas (5) and (6), i is an integer not less than 2, the inclination angle of the current acoustic axis is $\theta_i=[\theta x_i, \theta y_i]$, and the inclination angle before the inclination angle of the current acoustic axis is adjusted is $\theta_{i-1}=[\theta x_{i-1}, \theta y_{i-1}]$;

S8, keeping $PC_i$ of the X axis and Y axis unchanged, moving the Z axis to the focusing plane $Z_{focus}$, manually adjusting two corner adjustment knobs of a probe clamping device until the amplitude of a hydrophone measurement signal at the current coordinate point is the maximum, and then proceeding to step S3.

Further, the position of the intersection of the acoustic axis can be judged and calculated according to the acquired sound field signal. The specific criterion can be a simple amplitude criterion or other criteria for calculating the symmetry center based on symmetry. Considering that the criterion based on amplitude (maximum amplitude) can only be used around the focusing plane, the criterion is invalid when being far away from the focusing plane (the signal amplitude on the acoustic axis is no longer the maximum value of the XOY plane). The criterion of intersection between the acoustic axis and the plane used in the present disclosure is not limited to the amplitude criterion, and other criteria can be introduced by increasing the distance between two planes to increase the robustness of measuring the acoustic axis angle. Since the acoustic axis angle measurement is a control parameter that affects the next iteration, the increase of the measurement robustness will enhance the robustness of the whole, iteration process.

Further, in S3 and S4, the computer controls the water tank system to automatically scan the current plane.

Further, the order of step S3 and the order of step S4 are interchangeable. When the order of S3 and the order of S4 are exchanged, correspondingly, S8 is performed, keeping $PC_i$ of the X axis and Y axis unchanged, moving the Z axis to the focusing plane $Z_{focus}$, manually adjusting two corner adjustment knobs of a probe clamping device until the amplitude of a hydrophone measurement signal at the current coordinate point is the maximum, and then proceeding to step S3, that is, the exchanged step S4.

To sum up, the method can quickly and effectively realize the manual acoustic axis accurate alignment.

Embodiment

A specific implementation process of aligning the acoustic axis using this method is given hereinafter, specifically comprising the following cycles:

S1, determining three planes $Z_{focus}$, $Z_1$ and $Z_2$ according to the focus position, wherein $D_{focus}$ is 13.3 cm, $Z_1$ and $Z_2$ are taken as the two planes at the upper side of the focus, and the corresponding distances a=2.8 cm and b=10.8 cm;

S2, finding a peak point of an underwater acoustic signal on the focusing plane $Z_{focus}$, and taking the peak point as an initial center point Pei, in which the value of the coordinate [$PC\_X_1$, $PC\_Y_1$] is [−8.18, −7.48] cm;

S3, in the $Z_1$ plane, taking $PC_1$ as the center, carrying out two-dimensional scanning in the range of [−5, 5] cm from the center, in X direction and in the range of [−5, 5] cm from the center in Y direction;

the specific process is as follows: setting the moving range of Y direction to move from −5 cm to 5 cm away from the center, for each value of Y, moving from −5 cm to 5 cm away from the center in X direction, recording the waveform point by point, then adding Y, and then moving in X direction of the next line; after moving in the range of Y direction, counting the maximum amplitude value of the received signal at each position point, and calculating the centroid position of the whole scanning plane according to the maximum amplitude value, in which the centroid position is $C1=[C1_X, C1_Y]=[−9.02, −8.75]$ cm;

S4, in the $Z_2$ plane, taking $PC_2$ as the center, carrying out two-dimensional scanning in the range of [−5, 5] cm from the center in X direction and in the range of [−5, 5] cm from the center in Y direction; the specific process is as follows: setting the moving range of Y direction to move from −5 cm to 5 cm away from the center, for each value of Y, moving from −5 cm to 5 cm away from the center in X direction, recording the waveform point by point, then adding Y, and then moving in X direction of the next fine; after moving in the range of Y direction, counting the maximum ampli-tude value of the received signal at each position point, and calculating the centroid position of the whole scanning plane according to the maximum amplitude value, in which the centroid position is $C2=[C2_X, C1_Y]=[−8.38, −7.78]$ cm;

S5, calculating the inclination angle $\theta_i=[\theta x_i, \theta y_i]=[4.57°, 6.91°]$ of the current acoustic axis according to the intersection points C1 and C2; where $\theta x_i$ is the included angle between the acoustic axis and Z axis after the acoustic axis is projected on XOZ plane, sand $\theta y_i$ is the included angle between the acoustic axis and Z axis after the acoustic axis is projected on YOZ plane.

$$\theta x_i = \arctan((C2_X - C1_X)/(b-a)) \quad (1)$$

$$\theta y_i = \arctan((C2_Y - C1_Y)/(b-a)) \quad (2)$$

S6, selecting an adjustment threshold of 0.001 degrees according to the accuracy requirement of acoustic axis adjustment, judging whether the inclination angle $\theta_i$ is less than the adjustment threshold, if so, aligning the acoustic axis, ending the adjustment, otherwise, proceeding to step S7;

S7, referring to the iterative algorithm given in the above specific implementation, calculating the inclination angle $\theta_i=[\theta x_i, \theta y_i]$ of the acoustic axis and the coordinate $PC_i=[PC\_X_i, PC\_Y_i]$;

S8, keeping $PC_i$ of the X axis and Y axis unchanged, moving the Z axis to the focusing plane $Z_{focus}$, manually adjusting two corner adjustment knobs of a probe clamping device until the amplitude of a hydrophone measurement signal at the current coordinate point is the maximum, and then proceeding to step S3.

The coordinates of $\theta_i$, $PC_i$ and C1, C2 under different numbers of iterations are shown in Table 1:

TABLE 1

| | θ (degrees) | | $PC_i$ (cm) | | C1 (cm) | | C2 (cm) | |
|---|---|---|---|---|---|---|---|---|
| | $\theta x_i$ | $\theta y_i$ | $PC\_X_i$ | $PC\_Y_i$ | $C1_X$ | $C1_Y$ | $C2_X$ | $C2_Y$ |
| i = 1 | 4.57 | 6.91 | −8.18 | −7.48 | −9.02 | −8.75 | −8.38 | −7.78 |
| i = 2 | 1.94 | 2.96 | −8.96 | −8.66 | −9.32 | −9.20 | −9.05 | −8.79 |
| i = 3 | −0.015 | −0.042 | −9.54 | −9.55 | −9.54 | −9.54 | −9.54 | −9.54 |
| i = 4 | 0.000035 | 0.000162 | −9.53 | −9.53 | −9.53 | −9.53 | −9.53 | −9.53 |

As can be seen from Table 1, after three iterations, the inclination angle $\theta_i$ of the acoustic axis is smaller than the current adjustment threshold, 0.001 degrees, that is, the acoustic axis has been aligned.

Figure 4:
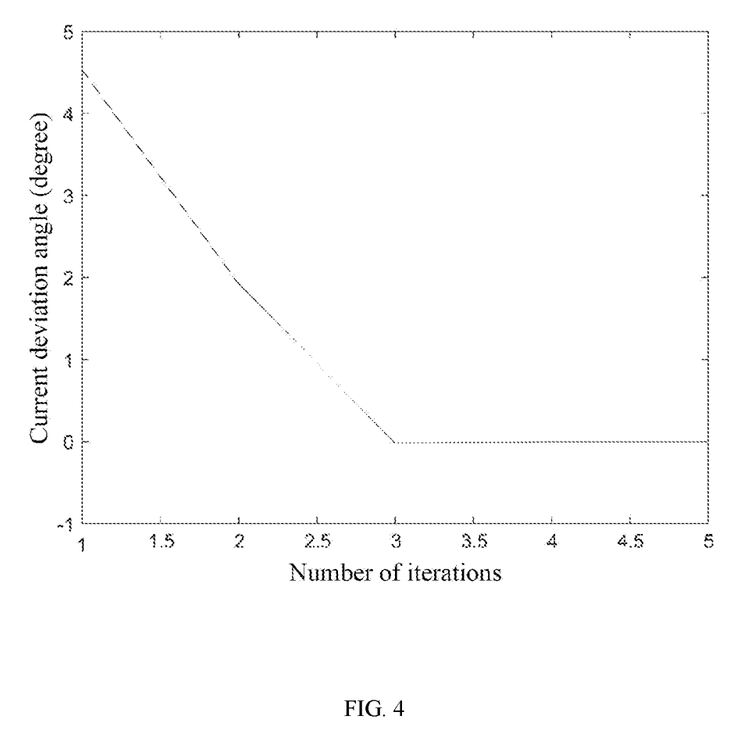
FIG. 4 is a graph showing the change of the current deviation angle of a manual acoustic axis aligning method in XOZ, plane with the number of iterations according to the present disclosure.
Figure 5:
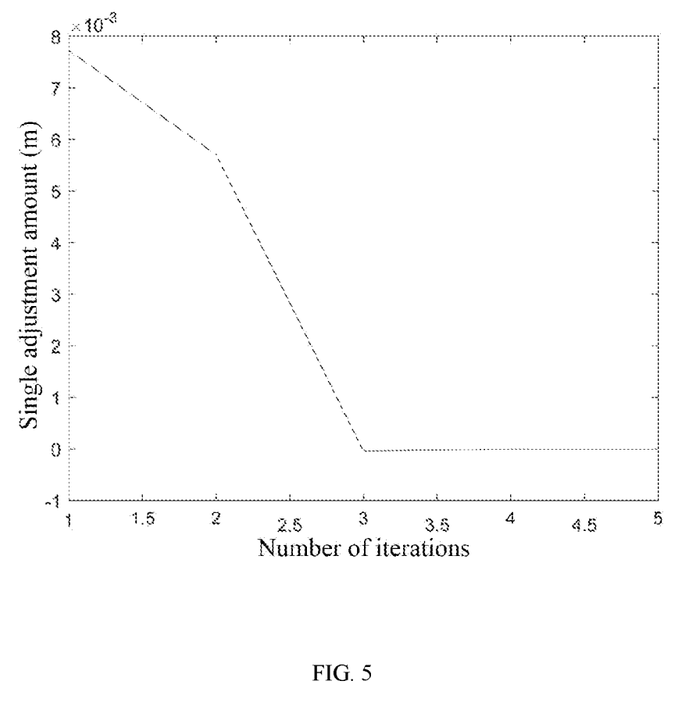
FIG. 5 is a graph showing the change of a single adjustment amount of a manual acoustic axis aligning method in XOZ plane with the number of iterations according to the present disclosure.
Figure 6:
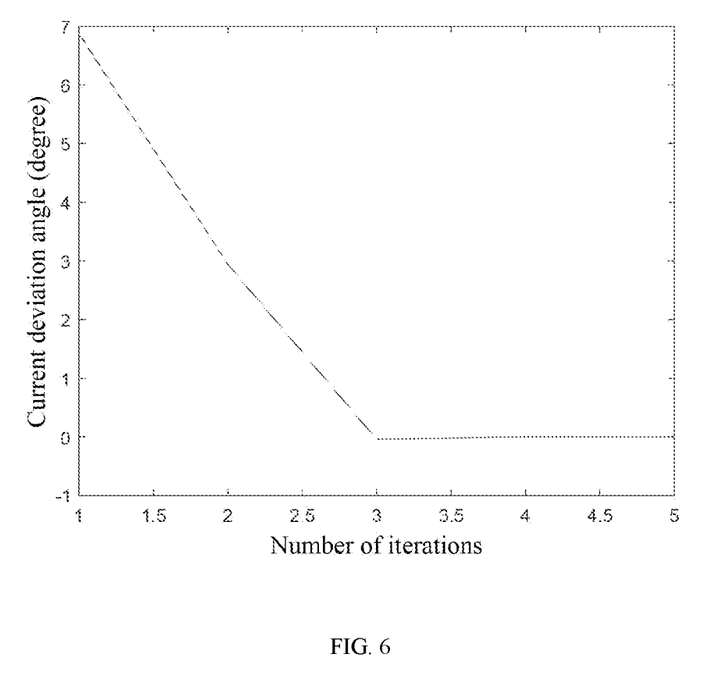
FIG. 6 is a graph showing the change of the current deviation angle of a manual acoustic axis aligning method in YOZ plane with the number of iterations according to the present disclosure.
Figure 7:
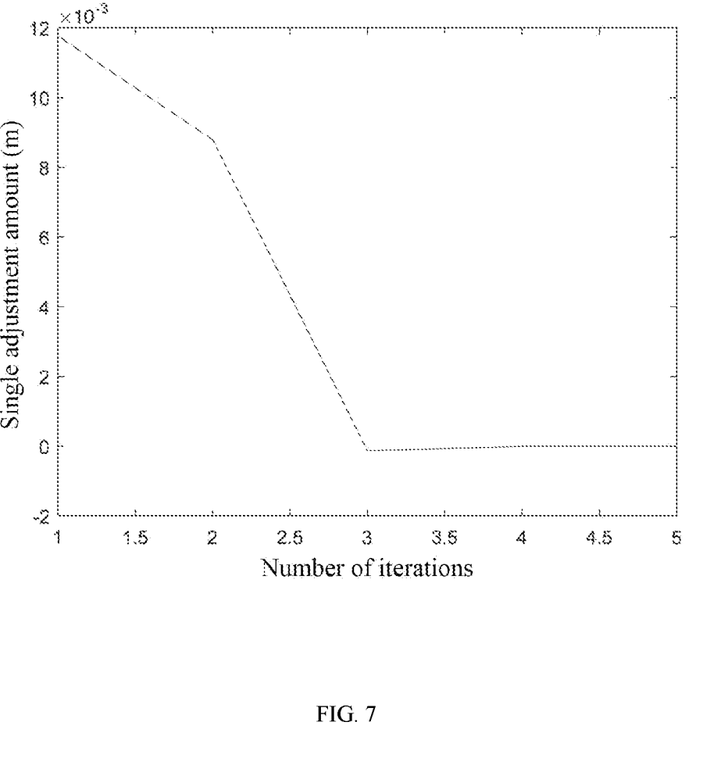
FIG. 7 is a graph showing the change of a single adjustment amount of a manual acoustic axis aligning method in YOZ plane with the number of iterations according to the present disclosure.

In this embodiment, according to the measured data in the actual acoustic axis alignment process, the acoustic axis deviation angle projection on XOZ plane and YOZ plane and the results of a single adjustment amount are recorded, and FIG. 4 to FIG. 7 are plotted. FIG. 4 is a graph showing the change of the current deviation angle of a manual acoustic axis aligning method in XOZ plane with the number of iterations according to the present disclosure. FIG. 5 is a graph showing the change of a single adjustment amount of a manual acoustic axis aligning method in XOZ plane with the number of iterations according to the present disclosure. FIG. 6 is a graph showing the change of the cumin deviation angle of a manual acoustic axis aligning method in YOZ plane with the number of iterations according to the present disclosure. FIG. 7 is a graph showing the change of a single adjustment amount of a manual acoustic axis aligning method in YOZ plane with the number of iterations according to the present disclosure. It can be seen from FIG. 4 to FIG. 7 that the purpose that the current deviation angle and the single adjustment amount can be close to zero after three iterations in both planes can be achieved.

The above contents are only specific embodiments of the present disclosure to enable those skilled in the art to understand or realize the present disclosure. Many modifications to the above embodiments will be obvious to those skilled in the art, and the general principles defined herein can be implemented in other embodiments without departing from the spirit or scope of the present disclosure.

It should be understood that the present disclosure is not limited to what has been described above, and various modifications and changes can be made without departing from the scope. The scope of the present disclosure is limited only by the appended claims.

What is claimed is:

1. A non-transitory computer readable storage medium containing computer executable instructions, which when executed configure at least one computer processor to perform a manual acoustic axis aligning method for an ultrasonic sound field measuring system, specifically comprising the following cycles:
   1) determining three planes according to a focus position, wherein the three planes are a focusing plane $Z_{focus}$, an acoustic axis angle detection plane $Z_1$ and an acoustic axis angle detection plane $Z_2$; defining distances from a probe to the focusing plane $Z_{focus}$, the acoustic axis angle detection plane $Z_1$ and the acoustic axis angle detection plane $Z_2$ as $D_{focus}$, a and b, respectively;
   2) determining a peak point of an underwater acoustic signal of the focusing plane $Z_{focus}$ and taking the peak point as an initial center point $PC_1$, and denoting the coordinate of the initial center point $PC_1$ as $[PC\_X_1, PC\_Y_1]$;
   3) in the acoustic axis angle detection plane $Z_1$, scanning with $PC_i$ as the center, changing the coordinates of X and Y, and acquiring sound field signals to obtain the intersection $C1=[C1_X, C1_Y]$ between the acoustic axis and the acoustic axis angle detection plane $Z_1$, where i is a positive integer;
   4) in the acoustic axis angle detection plane $Z_2$, scanning with $PC_i$ as the center, changing the coordinates of X and Y, and acquiring sound field signals to obtain the intersection $C2=[C2_X, C2_Y]$ between the acoustic axis and the acoustic axis angle detection plane $Z_2$, where i is a positive integer;
   5) calculating the inclination angle $\theta_i=[\theta x_i, \theta y_i]$ of the current acoustic axis according to the intersection points C1 and C2; $\theta x_i$ is the included angle between the acoustic axis and Z axis after the acoustic axis is projected on XOZ plane, and $\theta y_i$ is the included angle between the acoustic axis and Z axis after the acoustic axis is projected on YOZ plane;
   6) judging whether the inclination angle $\theta_i$ is less than a adjustment threshold, if so, aligning the acoustic axis, ending a adjustment, otherwise, proceeding to step 7);
   7) according to the inclination angle $\theta_i$, calculating the next coordinate $PC_i=[PC\_X_i, PC\_Y_i]$ by using an iterative algorithm, where i is an integer not less than 2;
   8) keeping $PC_i$ of the X axis and Y axis unchanged, moving the Z axis to the focusing plane $Z_{focus}$, manually adjusting two corner adjustment knobs of a probe clamping device until the amplitude of a hydrophone measurement signal at the current coordinate point is the maximum, and then proceeding to step 3).

2. The non-transitory computer readable storage medium according to claim 1, wherein in step 1), the acoustic axis angle detection plane $Z_1$ and the acoustic axis angle detection plane $Z_2$ are located on the same side or different sides of the focusing plane $Z_{focus}$.

3. The non-transitory computer readable storage medium according to claim 1, wherein in step 2), the peak point is the maximum point of the underwater acoustic signal of the focusing plane.

4. The non-transitory computer readable storage medium according to claim 1, wherein in step 3) and step 4), according to the acquired sound field signals, the intersection $C1=[C1_X, C1_Y]$ between the acoustic axis and the acoustic axis angle detection plane $Z_1$, and the intersection $C2=[C2_X, C2_Y]$ between the acoustic axis and the acoustic axis angle detection plane $Z_2$ are obtained by a simple amplitude criterion or the criterion for calculating the symmetry center based on symmetry, respectively.

5. The non-transitory computer readable storage medium according to claim 4, wherein the simple amplitude criterion is the amplitude maximum criterion, and the criterion for calculating the symmetry center based on symmetry is the centroid criterion.

6. The non-transitory computer readable storage medium according to claim 1, wherein in step 5), the specific calculation formula of the coordinate value of the inclination angle $\theta_i$ is as follows:

$$\theta x_i = \arctan((C2_X - C1_X)/(b-a)) \quad (1)$$

$$\theta y_i = \arctan((C2_Y - C1_Y)/(b-a)) \quad (2).$$

7. The non-transitory computer readable storage medium according to claim 1, wherein in step 7), calculating the next coordinate $PC_i=[PC\_X_i, PC\_Y_i]$ by using an iterative algorithm has the specific calculation process as follows:
   if the inclination angle of the current acoustic axis is obtained after the first adjustment, calculating the adjustment amount according to & triangular relationship, the coordinate $PC_2=[PC\_X_2, PC\_Y_2]$ of a new center point is calculated according to the depth $D_{focus}$ of the focusing plane $Z_{focus}$ with the following formula:

$$PC\_X_2 = PC\_X_1 + \tan(\theta x_1) \times (D_{focus} - a) \quad (3)$$

$$PC\_Y_2 = PC\_Y_1 + \tan(\theta y_1) \times (D_{focus} - a) \quad (4)$$

in the above formulas (3) and (4), the inclination angle $\theta_1 = [\theta x_1, \theta y_1]$ of the current acoustic axis is obtained after the first adjustment;
   otherwise, the calculation formula of the coordinate $PC_{i+1} = [PC\_X_{i+1}, PC\_Y_{i+1}]$ of the new center point is as follows:

$$PC\_X_{i+1} = (PC\_X_i - PC\_X_{i-1})/(\theta x_i - \theta x_{i-1}) \times \theta x_i \quad (5)$$

$$PC\_Y_{i+1} = (PC\_Y_i - PC\_Y_{i-1})/(\theta y_i - \theta y_{i-1}) \times \theta y_i \quad (6)$$

in the above formulas (5) and (6), i is an integer not less than 2, the inclination angle of the current acoustic axis is $\theta_i = [\theta x_i, \theta y_i]$, and the inclination angle before the inclination angle of the current acoustic axis is adjusted is $\theta_{i-1} = [\theta x_{i-1}, \theta y_{i-1}]$.

8. The non-transitory computer readable storage medium according to claim 1, wherein the order of step 3) and the order of step 4) are interchangeable.

9. The non-transitory computer readable storage medium according to claim 1, wherein in step 3) and step 4), a computer controls a water tank system to automatically scan the acoustic axis angle detection plane $Z_1$ or the acoustic axis angle detection plane $Z_2$.

10. The non-transitory computer readable storage medium according to claim 1, wherein the larger the interval between the acoustic axis angle detection plane $Z_1$ and the acoustic axis angle detection plane $Z_2$, the higher the alignment accuracy.

* * * * *